US009486679B2

(12) United States Patent
Goldstein et al.

(10) Patent No.: US 9,486,679 B2
(45) Date of Patent: Nov. 8, 2016

(54) CARBON FIBER OR FIBERGLASS LACROSSE HEAD

(71) Applicant: Jag Lax Industries, Inc., Wilmington, DE (US)

(72) Inventors: James A. Goldstein, Weston, MA (US); Jacob Goldstein, Weston, MA (US); Jonathan Bond, Melrose, MA (US); Michael Kenneth Higgins, Weston, MA (US)

(73) Assignee: JAG LAX INDUSTRIES, INC., Wilmington, DE (US)

( * ) Notice: Subject to any disclaimer, the term of this patent is extended or adjusted under 35 U.S.C. 154(b) by 0 days.

(21) Appl. No.: 14/329,397

(22) Filed: Jul. 11, 2014

(65) Prior Publication Data

US 2015/0018136 A1  Jan. 15, 2015

Related U.S. Application Data

(60) Provisional application No. 61/845,569, filed on Jul. 12, 2013.

(51) Int. Cl.
| | | |
|---|---|---|
| *A63B 59/02* | (2006.01) | |
| *A63B 69/12* | (2006.01) | |
| *B29C 67/00* | (2006.01) | |
| *B33Y 80/00* | (2015.01) | |
| *B33Y 10/00* | (2015.01) | |
| *B29K 307/04* | (2006.01) | |
| *B29L 31/52* | (2006.01) | |

(52) U.S. Cl.
CPC ............... *A63B 59/02* (2013.01); *A63B 59/20* (2015.10); *B29C 67/0059* (2013.01); *B33Y 10/00* (2014.12); *B33Y 80/00* (2014.12); *A63B 2209/02* (2013.01); *B29K 2307/04* (2013.01); *B29L 2031/52* (2013.01)

(58) Field of Classification Search
CPC ...................................................... A63B 59/02
USPC ................................ 473/505, 510, 512, 513
See application file for complete search history.

(56) References Cited

U.S. PATENT DOCUMENTS

| | | | | |
|---|---|---|---|---|
| 4,034,984 A | * | 7/1977 | Crawford | A63B 59/20 273/DIG. 30 |
| 4,591,155 A | * | 5/1986 | Adachi | A63B 59/70 156/171 |
| 4,765,621 A | * | 8/1988 | Game | A63B 51/12 473/534 |
| 5,269,532 A | * | 12/1993 | Tucker | A63B 59/20 473/513 |
| 6,190,271 B1 | * | 2/2001 | Rappaport | A63B 69/0002 124/78 |
| 6,514,156 B1 | * | 2/2003 | Zorzi | A63B 53/10 428/36.3 |
| 7,238,128 B1 | * | 7/2007 | Filice | A63B 59/20 473/513 |
| 7,491,141 B1 | | 2/2009 | Tucker, Sr. et al. | |
| 7,618,335 B2 | | 11/2009 | Brown et al. | |
| 7,749,113 B2 | | 7/2010 | Morrow et al. | |

(Continued)

FOREIGN PATENT DOCUMENTS

WO   WO-2008149183 A1   12/2008

*Primary Examiner* — Gene Kim
*Assistant Examiner* — M Chambers
(74) *Attorney, Agent, or Firm* — Wilmer Cutler Pickering Hale and Dorr LLP

(57) ABSTRACT

A method of making a lacrosse head is provided. The method includes providing a lacrosse head design to a 3D printer, providing a first printing material to the 3D printer, the first printing material including carbon fiber or fiberglass, and printing the lacrosse head with the 3-D printer using the lacrosse head design and the printing material.

21 Claims, 12 Drawing Sheets

(56) References Cited

U.S. PATENT DOCUMENTS

| | | |
|---|---|---|
| 8,007,373 B2 | 8/2011 | Soracco et al. |
| 8,323,122 B2 | 12/2012 | Soracco et al. |
| 8,365,315 B2 | 2/2013 | Ortiz et al. |
| 2003/0008126 A1* | 1/2003 | Boesman ............... B29C 70/22 428/300.7 |
| 2004/0002398 A1* | 1/2004 | Morrow ................. A63B 59/20 473/513 |
| 2004/0157527 A1 | 8/2004 | Omar |
| 2005/0187044 A1 | 8/2005 | Tucker |
| 2009/0062041 A1 | 3/2009 | Tucker, Sr. et al. |
| 2010/0117822 A1 | 5/2010 | Hyatt |
| 2010/0190586 A1* | 7/2010 | House .................... A63B 69/00 473/446 |
| 2012/0234472 A1 | 9/2012 | Garcia et al. |
| 2013/0097050 A1 | 4/2013 | Soracco et al. |
| 2013/0178344 A1 | 7/2013 | Walsh et al. |
| 2014/0268604 A1* | 9/2014 | Wicker ................ B29C 70/885 361/760 |
| 2015/0018136 A1* | 1/2015 | Goldstein ........... B29C 67/0059 473/513 |

* cited by examiner

CARBON FIBER OR FIBERGLASS LACROSSE HEAD

CROSS-REFERENCE

This application claims the benefit of U.S. Provisional Application No. 61/845,569, filed Jul. 12, 2013, the entire contents of which is herein incorporated by reference.

BACKGROUND

Lacrosse is a competitive team sport with a number of leagues including Major League Lacrosse and an NCAA league. Lacrosse may be played by boys, girls, men, and women in various age appropriate local, regional, and national leagues and for schools. During the game, players use a lacrosse stick to receive and throw a ball. A lacrosse stick has three main parts: a shaft, a head, and a pocket. Traditionally, a shaft and a head may be made out of wood. The shaft may be made with a stiffer material, such as wood or a metal, while the head is made with a flexible material, as shown in FIG. 1. (Lacrosse stick. In Wikipedia. Retrieved Jun. 19, 2013, from http://en.wikipedia.org/wiki/Lacrosse_stick) A flexible head spreads the force of impact when a ball hits a pocket and helps a player pick up and throw a ball. To create a flexible head, manufacturers typically use plastic and an injection modeling process. But there are trade-offs to such flexibility. For example, the plastic material used is commonly subject to breakage at low temperatures, excessive flexibility at high temperatures, and yielding/warping under normal gameplay conditions. As a result, a player may need to replace the head many times a year.

SUMMARY

According to one aspect of the present disclosure, a 3D printed carbon fiber lacrosse head is provided. The lacrosse head may include a top region comprising plastic, a left sidewall comprising plastic, the left sidewall being adjacent to the top region, a right sidewall comprising plastic, the right sidewall being adjacent to the top region, and a bottom region comprising plastic, the bottom region being adjacent to both the left sidewall and the right sidewall such that the plastic of at least one of the top region, the left sidewall, the right sidewall, and the bottom region has one or more strands of carbon fiber dispersed throughout a cross-section.

In some embodiments, the left sidewall has one or more strands of carbon fiber dispersed through a cross-section of the left sidewall.

In some embodiments, the right sidewall has one or more strands of carbon fiber dispersed through a cross-section of the right sidewall.

In some embodiments, the top region has one or more strands of carbon fiber dispersed through a cross-section of the top region.

In some embodiments, the bottom region has one or more strands of carbon fiber dispersed through a cross-section of the bottom region.

In some embodiments, the top region has more strands of carbon fiber than the bottom region.

In some embodiments, the top region and bottom region both have less strands than both the left and right sidewalls.

In some embodiments, one or more cross-sections comprise a circular arrangement of carbon fiber strands.

In some embodiments, one or more cross-sections comprise a linear arrangement of carbon fiber strands.

In some embodiments, one or more cross-sections comprise a symmetric arrangement of carbon fiber strands.

In some embodiments, one or more cross-sections comprise an asymmetric arrangement of carbon fiber stands.

In some embodiments, one or more cross-sections comprise a square arrangement of carbon fiber strands.

In some embodiments, at least one carbon fiber strand extends through at least two of the top region, the left sidewall, the right sidewall, and the bottom region.

In some embodiments, at least one of the top region, the left sidewall, the right sidewall, and the bottom region comprises a plurality of carbon fiber strands parallel to each other.

In some embodiments, at least one of the top region, the left sidewall, the right sidewall, and the bottom region comprises a plurality of carbon fiber strands crossing each other to form a cross-hatch pattern.

In some embodiments, the lacrosse head may further include a filament extending through each of the top region, the left sidewall, the right sidewall, and the bottom region, wherein a shape of the top region, the left sidewall, the right sidewall, and the bottom region is dependent upon an amount of tension applied to the filament.

In some embodiments, at least one of the left sidewall and the right sidewall comprises a plurality of holes extending laterally through the left sidewall and/or the right sidewall, and at least one carbon fiber strand disposed adjacent to the plurality of holes.

In some embodiments, the top region has a smooth back surface opposite a pocket formed by the top region, the left sidewall, the right sidewall, and the bottom region.

In some embodiments, a pivot point is formed in the left sidewall and the right sidewall based on the one or more strands of carbon fiber in the top region, the left sidewall, the right sidewall, and the bottom region.

In some embodiments, the lacrosse head may further include a neck region comprising plastic having one or more strands of carbon fiber dispersed throughout a cross-section of the neck, the neck being adjacent to the bottom region.

In some embodiments, the lacrosse head may further include an optical fiber element.

According to another aspect of the present disclosure, a method of 3D printing a carbon fiber lacrosse head is provided. The method can include three-dimensionally printing a top region, three-dimensionally printing a left sidewall, the left sidewall being formed adjacent to the top region, three-dimensionally printing a right sidewall, the right sidewall being formed adjacent to the top region, and three-dimensionally printing a bottom region comprising plastic, the bottom region being formed adjacent to both the left sidewall and the right sidewall such that the plastic of at least one of the top region, the left sidewall, the right sidewall, and the bottom region has one or more strands of carbon fiber dispersed throughout a cross-section.

DESCRIPTION

Figure 1:
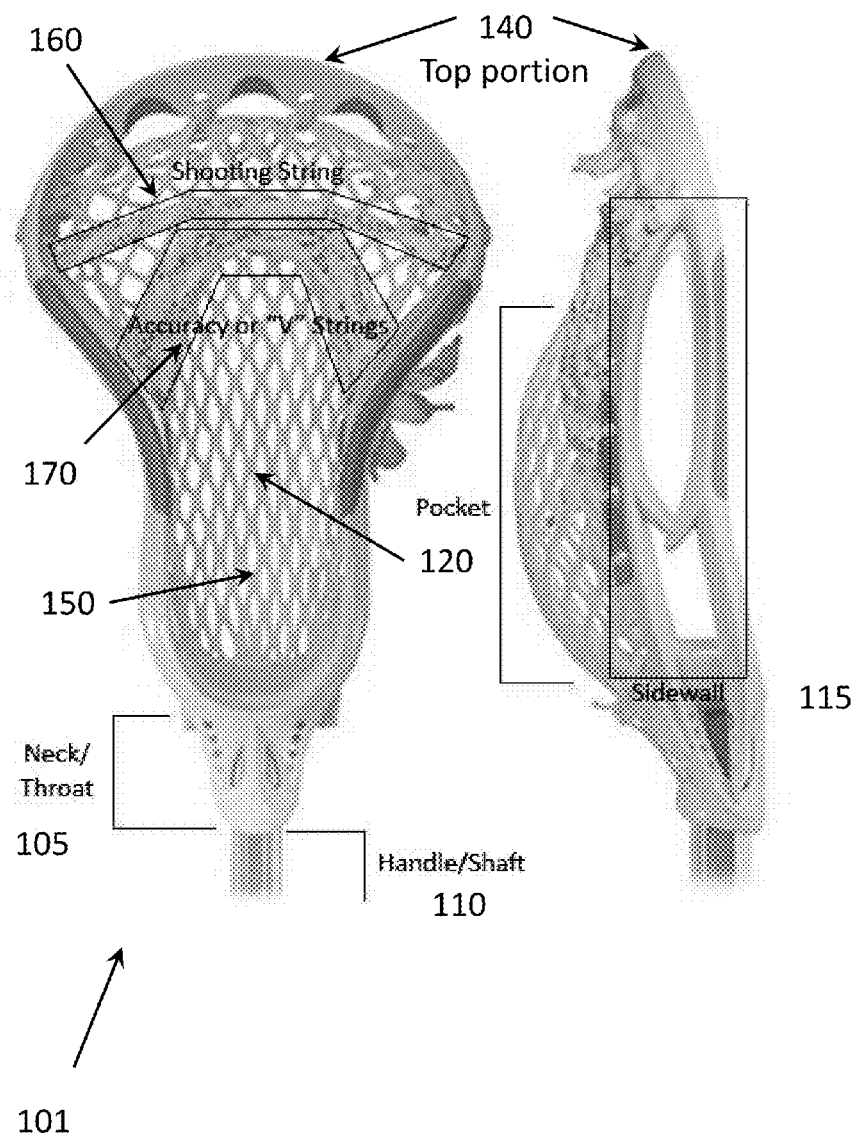
FIG. 1 shows a lacrosse head in accordance with an embodiment of the present disclosure.

A 3D printed lacrosse head is provided according to embodiments of the present disclosure. In some embodiments, the lacrosse head can be printed with a first material (e.g., plastic) and a second material such as carbon fiber, carbon fiber composites, fiberglass, fiberglass composites, Kevlar® or other aramid fiber, and other appropriate materials. A 3D printed carbon fiber lacrosse head can be more durable than a plastic lacrosse head and can be customized. A 3D printed lacrosse head can include an optical wire or an electrical wire to embed a sensor or a light source.

It can be desirable to control the strength and flexibility of a lacrosse head because of its effects on player performance. For example, a flexible head may not contain the ball when hit by an opposing player's stick whereas a stronger head would. Flexibility may be specifically controlled for certain aspects of the game—for example, a right handed player may want the right side of their stick to be flexible for face offs, but strong elsewhere for game play. Therefore, choosing the material and customizing it based on a player's need to achieve the desired strength and flexibility of the lacrosse head can be desirable. Exemplary materials can be carbon fiber, carbon fiber composite materials, fiberglass, fiberglass composite materials, and Kevlar®. Carbon fiber has a high ratio of strength to weight, so a carbon fiber lacrosse head can make the equipment light and helps a player be efficient throughout the play. Similarly, fiberglass has a high strength-to-weight ratio. In some embodiments, a combination of fiberglass and carbon fiber may be utilized to suit a desired stiffness and flexibility profile.

The high ratio of strength to weight of carbon fiber provides an advantage of reducing the total amount of material necessary to form a lacrosse head while maintaining appropriate strength and flexibility. For example, certain aspects of a lacrosse head (e.g., sidewalls) may be smaller in width or dimension while maintaining appropriate stiffness and flexibility characteristics. The reduced dimensions may provide an advantage of increased aerodynamics and, for example, may be beneficial to increase shot speed. The reduction in the overall amount of material used may also lead to a reduced weight and provide a player with increased agility and endurance over the course of a full game. Additionally, the overall reduction in materials may provide cost savings for certain materials.

A user can choose the material of desired strength and flexibility and use a 3D printer to print a lacrosse head with the material. Making a lacrosse head can use various 3D printers, including a Mark Forged 3D printer (MA), Makerbot replicator (Brooklyn, N.Y.), Printrbot GO (Lincoln, Calif.), Cubify Cube 3D printer (Rock Hill, S.C.), Solidscape 3Z studio (Merrimack, N.H.), and RepRap Pro (Peasedown St. John, UK), and various 3D printing technologies, which allows forming a three-dimensional object. The 3D printers range from industrial printers that cost hundreds to several hundred thousands of dollars, to home use printers that cost a few hundred dollars. A user can use a home use printer to print an object at home or send a design to an industrial 3D printing facility to print it.

A user provides a three dimensional design of an object to a 3D printer, and the 3D printer prints the object one layer at a time. For each layer of printing, a 3D printer lays a 3D printing material on a base plate or on top of a previous layer of the object and solidifies the material. After finishing a layer, the 3D printer starts printing the next layer.

Examples of 3D printing processes include selective laser melting, direct metal laser sintering, selective laser sintering, fused deposition modeling, electron beam freeform fabrication, electron beam melting, selective heat sintering, laminated object manufacturing, direct light processing, and stereolithography.

Among many other materials used by various 3D printing processes, some exemplary materials include thermoplastics (e.g., nylon), eutectic metals, metal alloys (e.g., titanium allows, cobalt chrome alloys), stainless steels, aluminum, carbon fiber, carbon fiber composite, Kevlar®, ceramic powders, fiberglass, and photopolymer.

In an exemplary case, according to an aspect of the present disclosure, one of these printers could be supplied with carbon fiber, plastic, fiberglass, or a mixture of carbon fiber and plastic, in addition to many other printing materials, and the printer can be programmed to print a lacrosse head using carbon fiber and a mixture of carbon fiber and plastic.

The ability to mix materials can be useful to achieve a certain stiffness and durability. For example, a mixture of 95% carbon fiber and 5% plastic, compared to 5% carbon fiber and 95% plastic, has a higher Young's modulus and therefore has a higher stiffness. Depending on the desired stiffness, one can print a lacrosse head using a different material or a mixture of different proportions of materials. For example, a user can select a mixture of 50% carbon fiber and 50% plastic or 30% carbon fiber and 70% plastic. The percentages or concentrations of the material may be based on weight, volume, the number of passes by a 3D printer, or other appropriate measureable units. Carbon fiber-reinforced plastic, or a mixture of carbon fiber and plastic, is presented as an example, but any other materials that can be used with 3D printing technique are within the scope of this invention. This ability to customize based on the player preference can help lacrosse players to select the right equipment easily.

In some embodiments, a user can specify the strength of various sections; for example: the neck/throat, all or a portion of the sidewalls, and the top portion or scoop. A user can interact with a Graphical User Interface (GUI) to either control the 3D printer itself using a computer or to set instructions for the materials and composition of the lacrosse head to be printed. In other embodiments, the user can specify the configuration and send it to a 3D printing company to make the head.

Alternatively, there can be a web-based interface. The interface can be simple for an inexperienced user. For example, a user can select portions of the design using a cursor and enter a number for the stiffness. A lacrosse head design can be pre-divided into multiple sections (e.g., left, right, top, middle, bottom) such that a user can specify the strength in each of these sections. In some instances, a lacrosse head may be divided into predetermined sections including a top portion, an upper left sidewall, an upper right sidewall, a lower left sidewall, a lower right sidewall, and a neck. A user may accordingly select any one of the predetermined sections and be provided with common options for stiffness, flexibility, and composition, and/or an option to specify the exact composition. Alternatively, a user may provide a 3D data matrix that indicates the stiffness in every point of a discretized three dimensional object. Using the specified strength, the system can automatically select the right proportions of materials or can prompt a user to provide the right material.

The use of carbon fiber and fiberglass in sporting equipment can be useful because carbon fiber and fiberglass have a high strength-to-weight ratio. It can be desirable to have light sporting equipment to improve the player performance and to reduce potential injury and muscle pain, especially for lacrosse players who have to hold and swing their lacrosse sticks during the entire game. Also, having a strong lacrosse stick can prevent the breaking of lacrosse sticks/heads. Carbon fiber and fiberglass achieve both goals of making equipment light and strong.

In some embodiments, a user may specify one or a plurality of materials to be used in manufacturing the lacrosse head. In additional embodiments, a user may specify materials to be used in particular sections of a lacrosse head. Traditional lacrosse heads are formed using injection molding techniques. However, customization using traditional injection molding is complicated and cost prohibitive due to the limitations of those processes. For example, injection molding machines are expensive, reconfiguring a machine or tooling takes a significant amount of time and cost, and an injection molding machine may not be used when being reconfigured, resulting in lost productivity. Traditional injection molding techniques are also highly limited in the types of materials that may be used and the possible shapes to mold. As a result, producing customized lacrosse heads using one or a plurality of materials is not easily achieved using traditional techniques. Traditional injection molding techniques additionally create weld lines in the head which are frequent points of failure. However, it is possible to achieve high levels of customization while eliminating weak weld points using the techniques of the present disclosure. Further, it is possible to easily change the overall design and shape of a lacrosse head in ways that could not be done with traditional manufacturing techniques.

As illustrated in FIG. 1, a lacrosse head 101 is connected to a lacrosse shaft/stick 110 and a pocket 120. Lacrosse head 101 includes a neck 105, sidewalls 115, and a top portion 140. Connected to the top portion 140 and sidewalls 115 are a series of strings including a shooting string 160 and accuracy or "V" strings 170. To customize and improve a lacrosse head based on the need, a user can provide a more durable material for a section that breaks, bends, or deforms easily. For example, neck/throat 105 can be made of a stiff material (e.g., 80% carbon fiber and 20% plastic) and sidewalls 115 can be made of a flexible material (e.g., 50% carbon fiber and 50% plastic). If the player desires to make the top portion 140 more flexible, 40% carbon fiber and 60% plastic, for example, can be used among other available combinations. In some embodiments, fiberglass and fiberglass composites can be used in addition to or instead of carbon fiber and carbon fiber composites. Additional concentrations of materials suitable for a variety of needs may be specified by a user.

For example, a lacrosse head may be designed and customized based on field position. In lacrosse, players occupy one of four categories of players: attackman, midfielder, defenseman, and goalie. Each position provides a unique role in the game with different utilization of a lacrosse stick and head. For instance, an attackman may utilize the stick for offensive maneuvers such as shots on goal and passing while a defenseman may utilize the stick defensively, using the stick to hit an attackman's shaft, head, and arms.

As a result, it may be desirable to customize the lacrosse head for an attackman to be more flexible in certain portions while a lacrosse head for a defenseman to be stiffer in certain portions. Specific stiffness and flexibility options tied to position may be preset and provided to a user for selection via the interface. To achieve this variation in design, different amounts of carbon fiber (e.g., 5%, 10%, 25%, etc.) along with other varied materials may be utilized in the head during fabrication.

For instance, a lacrosse head designed for an attackman may contain less carbon fiber (e.g., 0%-5%) in certain portions to be more flexible while a lacrosse head for a defenseman may contain more carbon fiber (e.g., 10%-25%) in certain portions to be more stiff. For example, a player may prefer a stiffer scoop and shoulder area for poke checks, stiffer sidewalls for slap checks, a softer more flexible scoop for ground balls, or a stiffer throat for shooting accuracy. Any number of predetermined material combinations may be used to achieve the desired stiffness, flexibility, and durability. Further, a user is not limited to the suggested composition design for each position and may alter the design to meet their needs.

Figure 2:
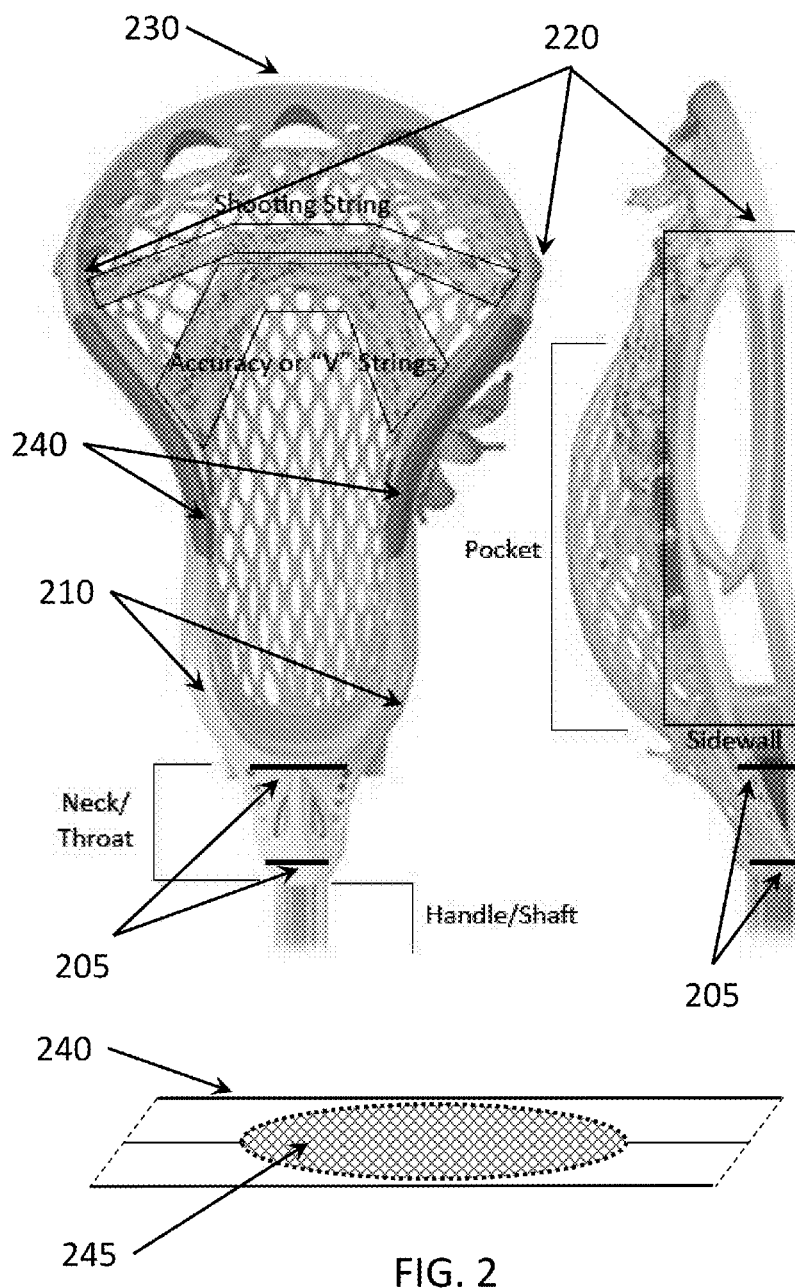
FIG. 2 shows a lacrosse head in accordance with an embodiment of the present disclosure.

In order to provide further customization of a lacrosse head for a user, the material composition of the lacrosse head may vary within the head. FIG. 2 shows one embodiment of a lacrosse head according to the present disclosure having a non-uniform composition of material. In some instances, the neck/throat of the lacrosse head may be reinforced with a stronger material (e.g., carbon fiber) to prevent breakage of the neck/throat portion. For example, carbon fiber 205 may be disposed in the neck/throat of the lacrosse head during 3D printing. The carbon fiber 205 may be formed as one or a plurality of rings arranged along the neck during production. Alternatively, the carbon fiber 205 may be formed parallel to the stick, in a cross-hatch pattern, or any other appropriate pattern or shape. The specific amount or concentration of carbon fiber 205 may depend upon user preference but is generally higher than in other regions of the head (e.g., sidewalls). In one example, the carbon fiber 205 may be 25%, 50%, 75%, 100%, 200% or more than in other regions to provide more strength and durability. In additional embodiments, the neck/throat may be provided with strengthening material such as carbon fiber to enable the head to be inserted into the handle instead of going over and around the handle 110 without a comparative loss of stiffness. Inserting the neck/throat into the handle 110 may enable a shorter neck to reduce the distance from the top of the shaft to the lowest position that ball may sit in the pocket.

FIG. 2 also illustrates regions of a lacrosse head that may contain non-uniform concentrations of material. Certain regions or sections of a lacrosse head are subject to greater stresses than other regions and thus subject to breakage or failure. Accordingly, specific areas of the head may be reinforced with higher concentrations of strengthening material (e.g., carbon fiber) to prevent yielding of material, warping, pinching, and breakage. 3D printing enables the placement of such strengthening material.

For example, the transition point 210 from the neck/throat to the sidewall and the transition point 220 of the sidewall to the top portion 230 may be reinforced with a higher concentration of strengthening material (e.g., carbon fiber). The specific amount or concentration of carbon fiber at the transition points 210 and 220 may depend upon user preference but is generally higher than in other regions of the head. In one example, the carbon fiber at the transition points 210 and 220 may be 5%, 10%, 25%, 50%, 75%, 100%, 200%, or more than in other regions to provide more strength and durability. The concentration of carbon fiber may be based total fiber strands, by weight, by volume, or other appropriate units of measurement.

Furthermore, the top portion 230 may include a specific composition of material to enable more flexibility. In at least one example, the top portion 230 may contain no carbon fiber or a smaller quantity of carbon fiber relative to other regions of the lacrosse head. The top portion 230 may also be printed to have a smooth surface to reduce drag on the ground when picking up a ball.

FIG. 2 further illustrates a central region 240 of the sidewalls. In traditional injection molding techniques of manufacturing lacrosse heads, sidewalls are solid and generally formed of one material. Additionally, the sidewalls 240 are required to be thick enough to provide sufficient strength and durability for repeated use. With the present disclosure for producing lacrosse heads, however, the structure of the sidewall 240 may be greatly varied to form a variety of structures using non-uniform compositions of materials while achieving the desired strength, flexibility, and durability. In some instances, the sidewalls 240 may formed of a combination of materials including a strengthening material such as carbon fiber. The concentration, location, and orientation of carbon fiber in the sidewalls 240 may be controlled to provide more of less flexibility.

In at least one example, all or a portion of the sidewalls 240 may be formed of a honeycomb structure. FIG. 2 illustrates one example of a cutaway of the sidewall 240 having a honeycomb structure 245. The honeycomb structure 245 in the sidewalls 240 may reduce the overall weight of the head without reducing strength or flexibility. Strengthening material such as carbon fiber may be printed into or around the honeycomb structure 245 to provide extra strength. The honeycomb structure 245 may also be composed of carbon fiber or multiple materials. Additional portions of the lacrosse head (e.g., top portion and neck) may also be formed of a honeycomb structure. The lacrosse head is not limited to a honeycomb structure and may be any one of a variety of structures (e.g., lattice) to create sufficient strength and flexibility.

In another example, the sidewall 240 may contain a series of holes extending through the sidewalls 240. The holes may extend laterally through each sidewall 240 or may extend into but not through the sidewall 240. In some embodiments, the sidewalls may contain one or a plurality of circular holes of equal or varying dimensions. In other embodiments, the holes may be of varying shapes and dimensions. For example, holes extending fully through the sidewall may be smaller near the bottom of the head, larger at the middle of the sidewall 240, and smaller near the top 230 of the head. The holes may be any appropriate diameter (e.g., 1 mm, 2 mm, 5 mm, 10 mm, 25 mm, etc.) suitable for the design of the sidewalls 240. In some instances, the holes may be stringing holes to form the pocket.

Placement of the holes in the sidewalls may reduce the overall weight of the lacrosse head by further eliminating material in the head. However, to ensure that the holes do not cause weak points in the head, the material surrounding the holes may be reinforced with a sufficient amount of strengthening material such a carbon fiber while maintaining a proper balance of strength and flexibility. For example, carbon fiber strands may be placed above and/or below the holes during production (e.g., 3D printing). Alternatively, strands of carbon fiber may be formed during printing to surround each individual hole.

Figure 3:
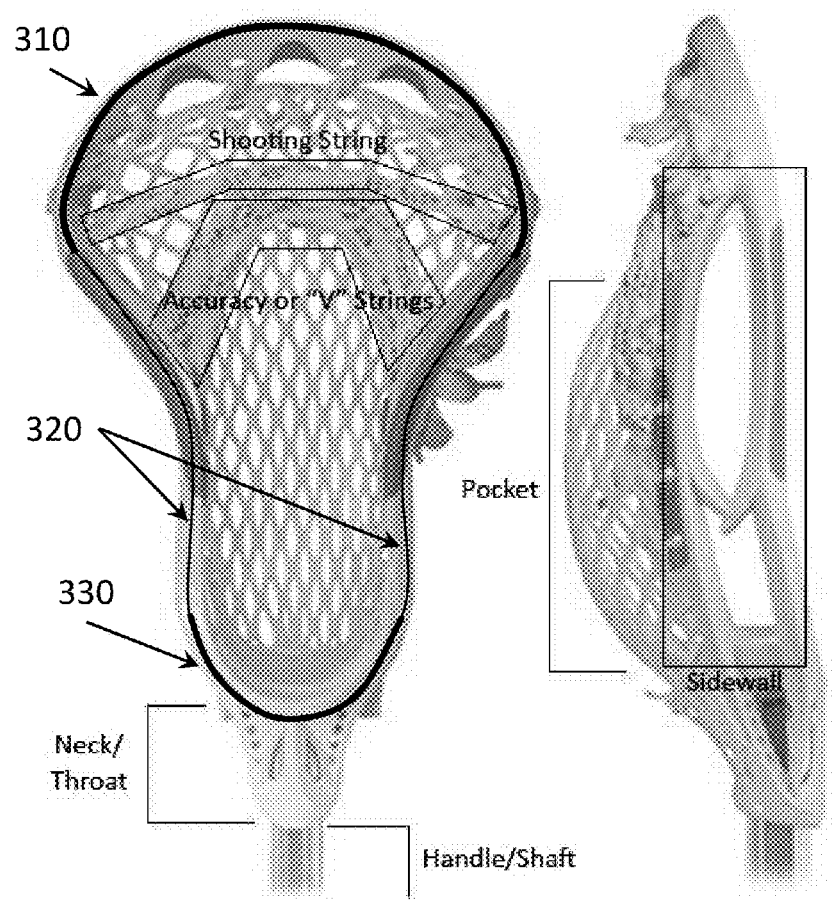
FIG. 3 shows a lacrosse head in accordance with an embodiment of the present disclosure.

FIG. 3 illustrates a further embodiment of a lacrosse head in accordance with the present disclosure. In this embodiment, gradations of carbon fiber are distributed through the lacrosse head. For example, multiple strands of various lengths (e.g., 1 mm, 5 mm, 10 mm, 15 mm, etc.) may be provided into differing sections of the lacrosse head when printing the head. This provides a gradation of structural properties unachievable through conventional manufacturing processes. In some embodiments, at least one strand of carbon fiber may be provided along a perimeter of the entire head. This may help to prevent breakage through the rail at the string holes. In addition to this, further strands of carbon fiber of various lengths may be provided in various sections of the head.

For instance, top portion 310 may contain a higher concentration of carbon fiber strands than the sidewalls (e.g., 50% more). In some instances, the top portion 310 may contain a plurality of carbon fiber strands (e.g., 5, 10, 25, 50, etc.) having various lengths (e.g., 1 mm, 5 mm, 10 mm, 15 mm, etc.) to provide strength while side walls 420 may contain fewer strands of carbon fiber. Additionally, bottom section 430 may contain a higher concentration of carbon fiber strands (e.g., 50% more) to improve strength and durability of the head. The carbon fiber strands may be placed in the head at various depths during a 3D printing process.

Figure 4:
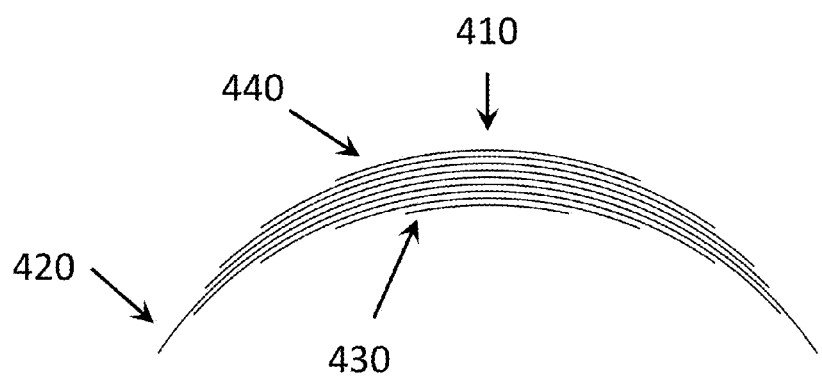
FIG. 4 shows a lacrosse head in accordance with an embodiment of the present disclosure.

FIG. 4 illustrates a further embodiment of a lacrosse head in accordance with the present disclosure. In this embodiment, strands of carbon fiber 420/430/440 may be placed at a particular weak point 410 commonly subject to breakage. For example, a plurality of strands may be placed one on top of the other beginning with the longest strand 420 running away from a weak point in multiple directions (e.g., away from the weak point along the perimeter of the head) and additional strands 430/440 of progressively shorter length being placed thereon. In another example, shorter strands 430 are placed first, progressively longer strands 420 are placed thereon, and then progressively shorter strands 440 are placed last during printing. Each of these strands may be centered at the weak point 410. Examples of the weak points include the throat and shoulders of the lacrosse head. The strands may be placed in parallel such that they run along the body of the lacrosse head from top to bottom, from front to back, or side to side. In addition, the strands may be placed in a cross-hatch pattern or other appropriate patterns based on the desired characteristics.

Figure 5:
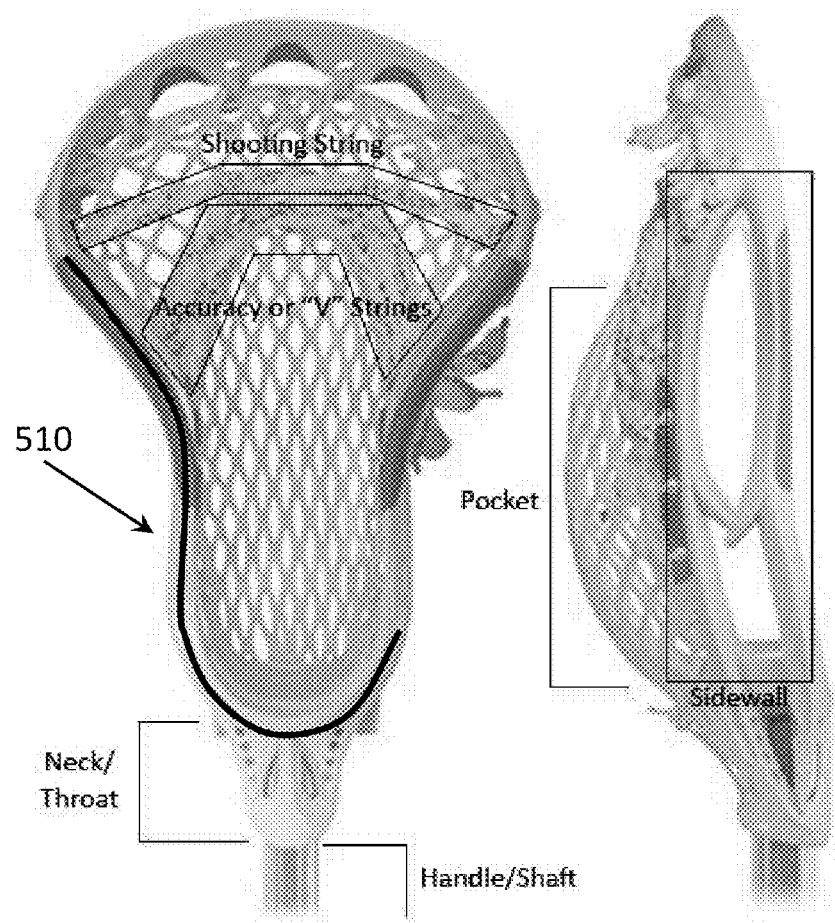
FIG. 5 shows a lacrosse head in accordance with an embodiment of the present disclosure.

FIG. 5 illustrates a further embodiment of a lacrosse head in accordance with the present disclosure. In this embodiment, one side of the lacrosse head has a higher concentration of strengthening material 510 than the opposing side. FIG. 5 illustrates the additional strengthening material 510 (e.g., carbon fiber) being placed on the left side and bottom of the head. However, the strengthening material 510 may also be placed on the right side and bottom of the head. This may be beneficial for particular players based on their position and whether they are left- or right-handed. Face-offs are one example where strengthening one side of the head may be beneficial. Additional movements during play such as a "pinch and pop" and "rakes" may also benefit from strengthening one side of the head. In some embodiments, the strengthening of a particular side or portion of the lacrosse head may be achieved by addition of gradations of carbon fiber along the body of the head.

Figure 6:
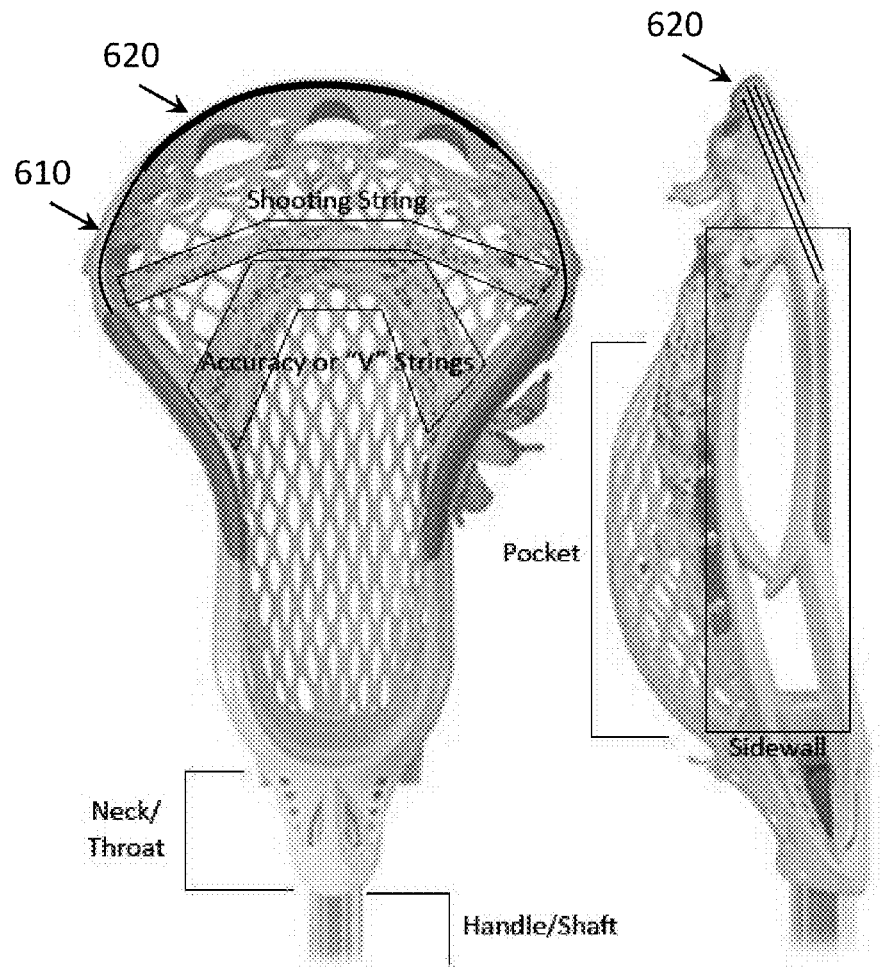
FIG. 6 shows a lacrosse head in accordance with an embodiment of the present disclosure.

FIG. 6 illustrates a further embodiment of a lacrosse head in accordance with the present disclosure. In this embodiment, the top portion or scoop 620 may be reinforced using strengthening material during the fabrication process. For example, a higher concentration of carbon fiber may be printed into the top portion 620. In some instances, the head may be printed with a gradation of carbon fiber strands extending through the top portion 620 into the shoulder 610. In this instance, longer strands may be centered at the top portion extending into the shoulder 610 while progressively shorter carbon fiber strands may be printed thereon to provide the gradation of stiffness. Accordingly, the top portion 620 would have more stiffness while the shoulder region 610 would have more flexibility.

Figure 7:
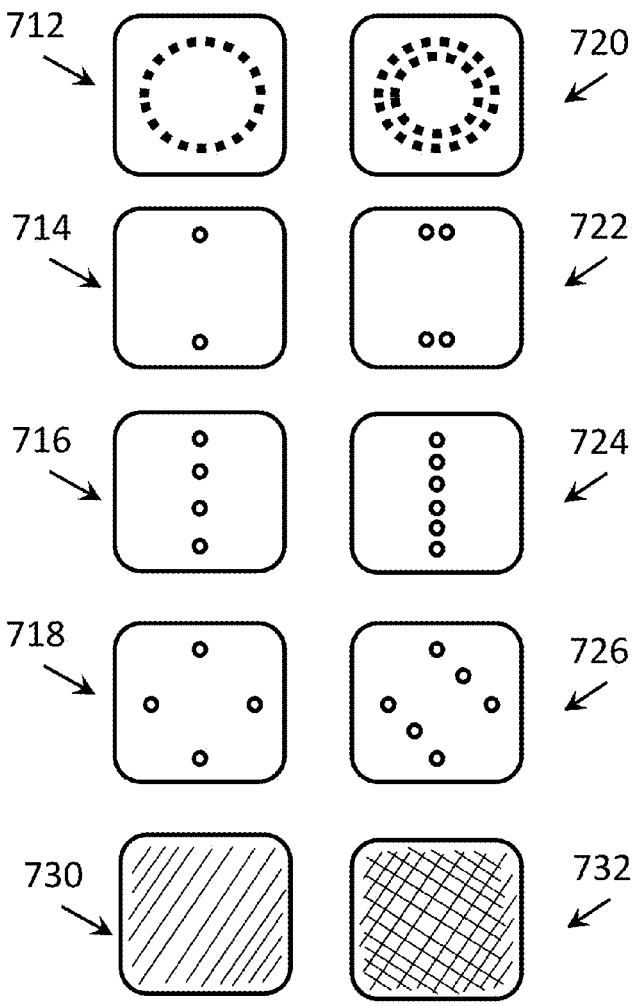
FIG. 7 shows a lacrosse head in accordance with an embodiment of the present disclosure.

FIG. 7 illustrates various examples of cross-sections of the lacrosse head with strengthening material embedded therein. In particular, FIG. 7 further shows various possible configurations of carbon fiber strand gradations and implementations. In some embodiments, the strands may be formed in a symmetrical arrangement. In additional embodiments, the strands may be formed in an asymmetrical arrangement. The carbon fiber strands may be formed in a ring 712 or multiple rings 720. The carbon fiber strands may be formed in parallel and spaced apart 714 or in groupings 722. The carbon fiber strands may be formed in a loosely packed vertical line 716 or a densely packed vertical line 724. In other instances, the carbon fiber strands may be spaced apart to form a diamond pattern 718 or in slanting rows 726. Further, the carbon fiber strands may be in a single direction 730 or cross-hatched 732. Various combinations of carbon fiber strand arrangements may be utilized in differing portions of the lacrosse head. Additional arrangements of the carbon fiber strands are contemplated but not illustrated.

Figure 8:
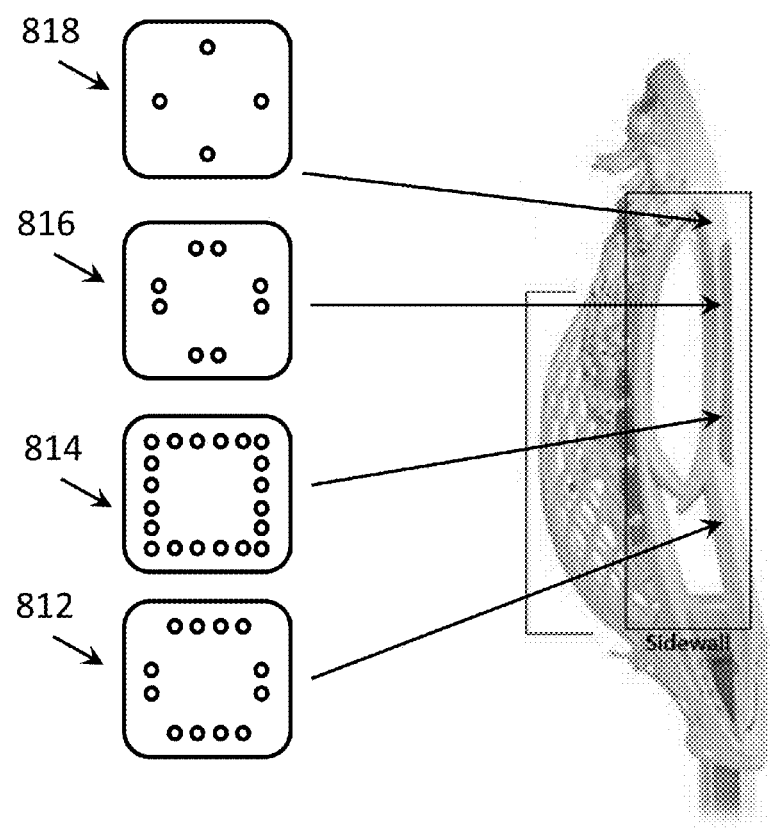
FIG. 8 shows a lacrosse head in accordance with an embodiment of the present disclosure.

FIG. 8 illustrates an example of a gradation of carbon fiber in a lacrosse head in accordance with the present disclosure. In this example, the sidewall is strengthened with carbon fiber strands to provide greater sidewall stiffness. The carbon fiber strands may extend along the sidewall parallel to the opening such that near the top of the head fewer strands are provided as shown in cross-section 818. Additional strands may be provided closer to the central portion of the sidewall as shown in cross-section 816 with the highest concentration being near the center as shown in cross-section 814. Fewer strands may also be provided between the center and the throat/neck of the lacrosse head as shown in cross-section 812. This illustrates just one example of how a gradation of strength/flexibility may be achieved. This arrangement may vary in accordance with desired stiffness, flexibility, and durability of the head. Additionally, the gradients may run in any direction through the head such as from front to back, at an angle, from side to side, etc. The gradations of the carbon fiber in the lacrosse head may be particularly advantageous to address non-uniform stresses placed on the head during gameplay and to reduce weak points. Conventional techniques for forming lacrosse heads, in contrast, have abrupt changes in bulk material properties due to the addition of inserts which lead to the creation of weak points, yielding of the material, and failure.

Figure 9:
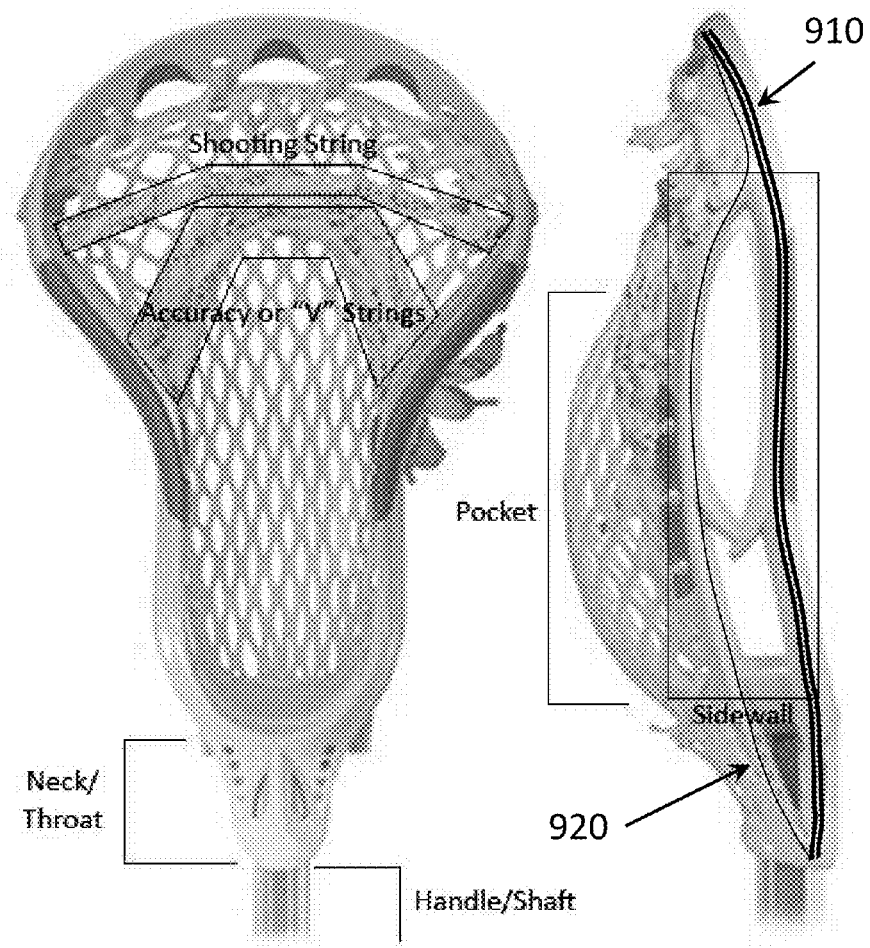
FIG. 9 shows a lacrosse head in accordance with an embodiment of the present disclosure.

FIG. 9 illustrates a further embodiment of a lacrosse head in accordance with the present disclosure. In this embodiment, more strengthening material is provided on a front of the lacrosse head 910 than the back of the lacrosse head 920. In at least one example, fewer carbon fiber strands (e.g., 25%-50% less) may be placed during fabrication in the back of the head 920 than in the front 910 resulting in a variation of the stiffness and flexibility of the head from front to back. In the embodiment shown, the additional strengthening material is provided on the front of the lacrosse head 910. However, the strengthening material may alternatively be provided on the back of the head 920. Further, strengthening material from front to back may be localized (e.g., more carbon fiber on back near throat and more carbon fiber in front near top). Additional arrangements of the strengthening material may be provided to suit user preferences.

Figure 10:
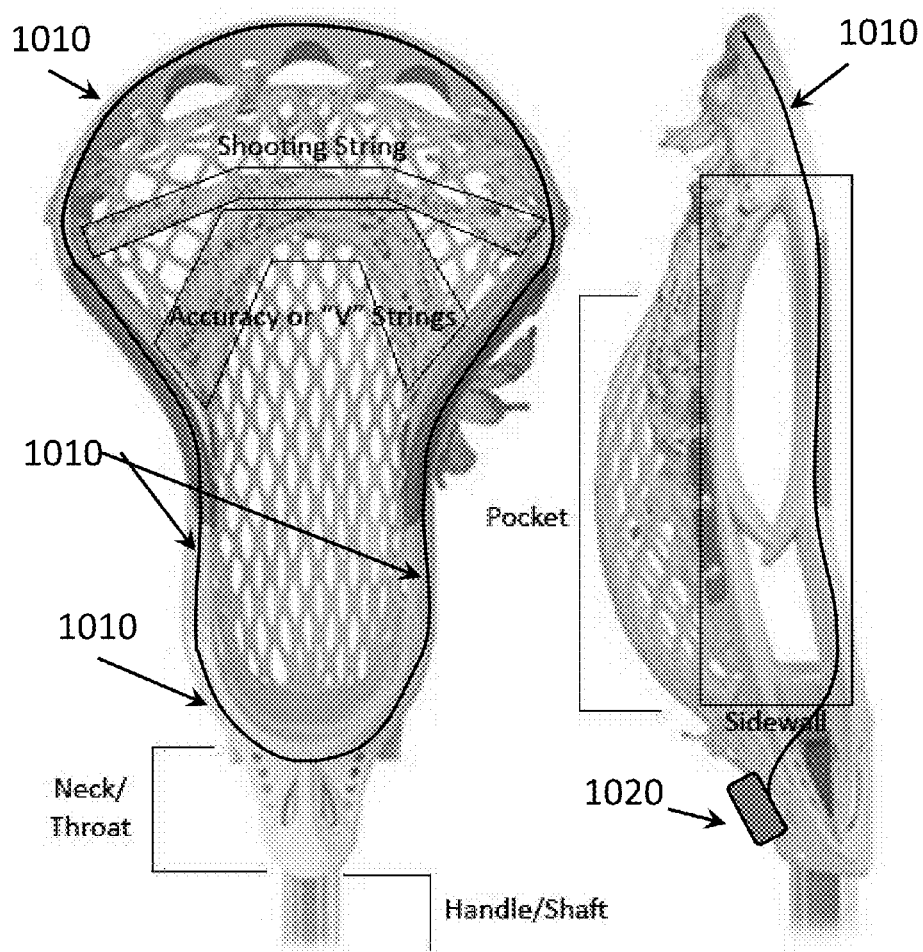
FIG. 10 shows a lacrosse head in accordance with an embodiment of the present disclosure.

FIG. 10 illustrates a further embodiment of a lacrosse head in accordance with the present disclosure. In this embodiment, a tensionable line made of wire or carbon fiber material may be provided along a perimeter of the lacrosse head body. The wire may be made out of any appropriate metal material. Alternatively, the tensioning line may be formed from one or a plurality of bundled carbon fiber and/or plastic strands. In some instances, the tensionable line may be added while printing the head or after the head has been printed. For example, the line may be printed into the head or a channel may be formed while printing such that the line may be added subsequent to the printing step. The tensioning line may connect to a knob 1020 mounted on the lacrosse head or the shaft. The knob 1020 may be used to adjust the tension on the line. In accordance with the amount of tension on the line, the head may become more stiff or more flexible. In addition, the shape of the head may be deformed (e.g., longer or wider) by adjusting the tension on the line.

Figure 11:
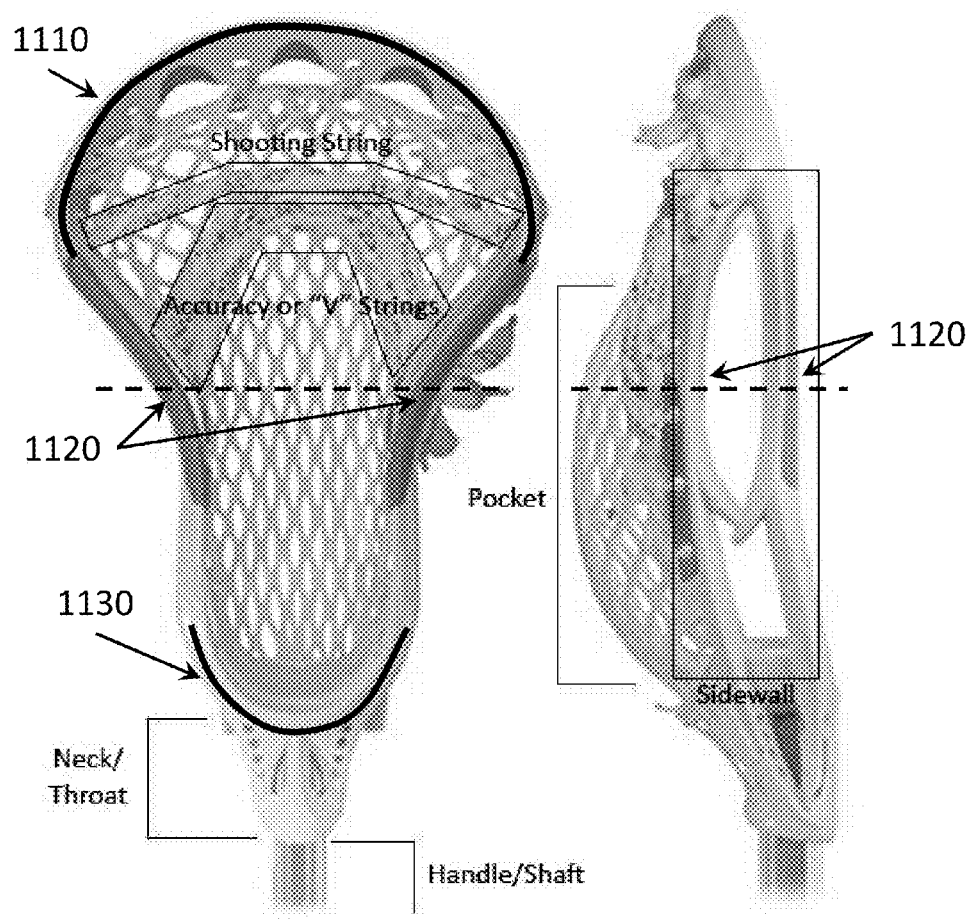
FIG. 11 shows a lacrosse head in accordance with an embodiment of the present disclosure.

FIG. 11 illustrates a further embodiment of a lacrosse head in accordance with the present disclosure. In this embodiment, a pivot point 1120 is created in the head by placing higher concentrations of strengthening material (e.g., carbon fiber) in certain portions of the lacrosse head. For instance, a higher concentration of carbon fiber may be placed in the top portion 1110 and the bottom 1130. In addition, a gradation of carbon fiber may be distributed to create a flexible but strong pivot point 1120 running laterally across this head. Alternatively, carbon fiber may be used to prevent breakage across a flexible area of reduced section in the plastic modulus material. The pivot point 1120 may be varied in accordance with the placement of the various materials within the head. For example, the pivot point may be closer to the top 1110 or the bottom 1130. Such a pivot point 1120 may often be referred to as a kick point. In additional embodiments, strands of carbon fiber may be placed around a particular point in varying patterns where it is desirable to allow for a bend in the head.

Figure 12:
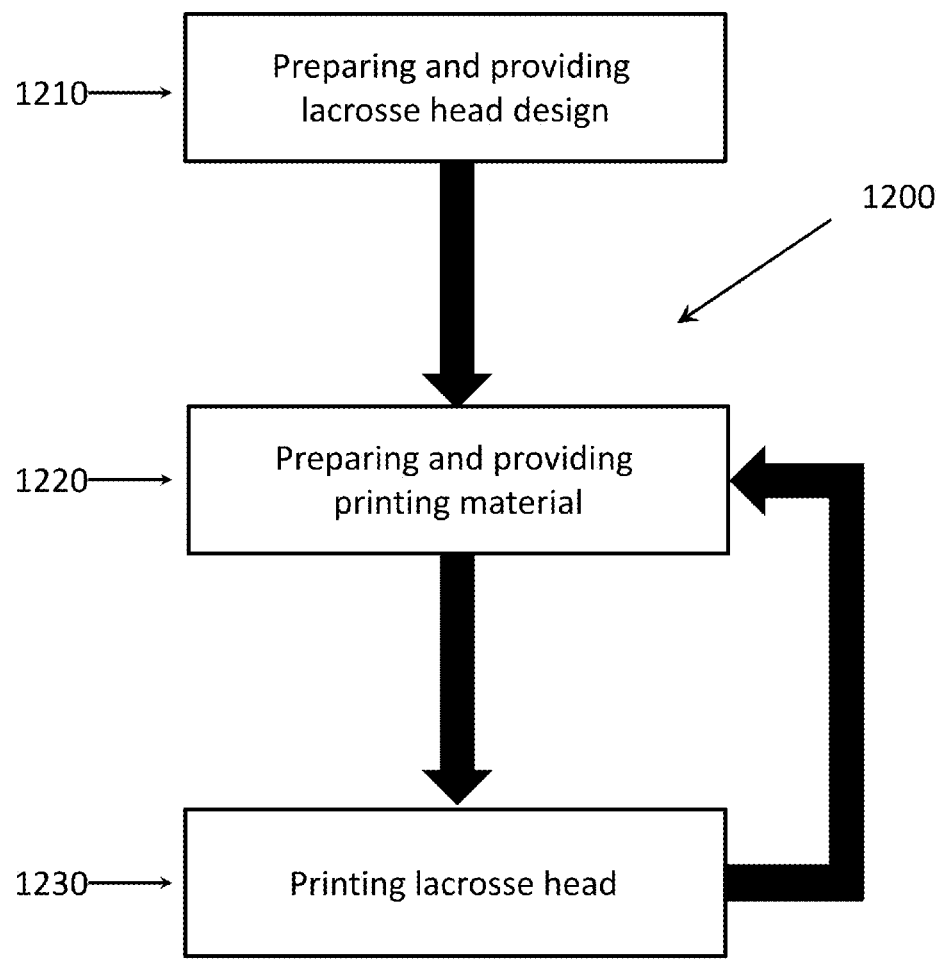
FIG. 12 illustrates a process of making a lacrosse head using a 3D printer according to embodiments of the present invention.

FIG. 12 illustrates process 1200 of making a lacrosse head using a 3D printer. The process includes preparing and providing lacrosse head design (step 1210), preparing and providing printing material (step 1220), and printing lacrosse head (step 1230).

In step 1210, a lacrosse head design is prepared and provided to a 3D printer. A user of a 3D printer can first prepare a lacrosse head design to be provided to the printer. A lacrosse head design template can be used, so the preparation step can be as simple as selecting a desired design. Alternatively, one can customize an existing design or build the design from scratch. A user can use a 3D design tool that is provided with a 3D printer, any other modeling software compatible with a 3D printer (e.g., Tinkercad, OpenSCAD, Blender), or a web site compatible with a 3D printer.

In some embodiments, the design customization can be varying the size or shape of a lacrosse head. The head can be slightly larger for a beginner to reduce the level of difficulty. Also, a user can customize the dimensions (e.g., length, width, depth) of a section of a lacrosse head. For example, one can increase the width of a bottom section of the head and decrease the height of a top section of the head. One can modify the design of the head for better aerodynamics.

Also, a lacrosse head design can be customized to include a pattern, such as an ornamental pattern. Various types of customization can enhance the look of a lacrosse head and make it unique. For example, logos, names, or emblems may be part of the lacrosse head design. When a design is prepared, the prepared lacrosse head design is provided to the 3D printer.

In some instances, a user may select a position to be played with the lacrosse head (e.g., attackman, midfielder, defenseman, or goalie) and be provided with one or multiple preset design options specific to those positions. Additionally, a user may specify whether they are left- or right-handed and be provided with one or multiple preset design options specific to left- and right-handed players. For instance, in a design for a right-handed player one sidewall may be stiffer while the other is more flexible and a design for a left-handed player provides an opposite configuration.

In some embodiments, the lacrosse head design software can provide a user feedback at the time of configuration. The software can provide feedback as to whether the dimensions comply with regulations for the user's desired level of play (e.g., women's or men's league, youth league, high school league, college league, professional league). The user also can receive information on the difference between the current configuration and older configurations that the user previously used. For instance, the software can notify the user that the current configuration is stiffer than the last configuration. Also, manufacturer's specifications from vendors can be displayed such that the user can compare the current configuration with other off-the-shelf lacrosse sticks. The software also can provide a list of equipment used by professional athletes to help a user design a lacrosse stick. In some embodiments, the software may allow a user to share their configuration and design with other users.

In step 1220, a printing material is prepared and provided to the 3D printer. The printing material can be a default material provided with the printer. A user can buy a commercially available printing material. To vary materials, a user can manually replace a material being provided to a 3D printer with another material before a new section is printed. Alternatively, a 3D printer can be configured to automatically switch the materials. Some commercially available 3D printers use dual extruders where the two extruders use different materials. Dual extruder-based printers can be programmed to automatically switch between two materials. A lacrosse head can be printed with a 3D printer with more than two extruders using more than two materials. In at least one example, a mixture of plastic and carbon fiber may be printed to form a lacrosse head in accordance with the present disclosure.

In some embodiments, each section of the lacrosse head may be printed using a 3D printer. In other embodiments, a portion of the lacrosse head may be printed using a 3D printer and then incorporated into a lacrosse head formed using traditional techniques. For example, a 3D printed emblem, logo, or badge may be printed using the described techniques and then incorporated into a lacrosse head using traditional injection molding as an insert. In another example, a throat or sidewall may be printed using the 3D printing techniques described herein, incorporated into a traditional injection molded lacrosse head as an insert, and then overmolded with plastic.

In some embodiments, a user can also add a color additive to a printing material based on the custom design. By adding a color additive, a 3D printer can print a lacrosse head with a desired color. For example, a color additive of red can be used to form a red lacrosse head. In other embodiments, two or more colors can be used. Similar to using a number of materials with different compositions, two or printing materials with different colors can be used. The above technique of replacing materials to be printed can be used to print a lacrosse head with different colors on different sections. The materials with different colors can have the same chemical composition to create the same physical qualities or different compositions.

Alternatively, color can be added separately, rather than being mixed into the printing material. A 3D printer can have a separate extrusion for providing color additives to the object being printed. Similar to 2D printing, there can be multiple inks being added to the lacrosse head. In some instances, the colors may be used to produce colors and logos for particular team.

In additional embodiments, one can embed an optical or electrical wire in a lacrosse head using a 3D printer capable of printing an optical or electrical wire. Using this technology, a 3D printer can embed a light source such that the lacrosse head illuminates. Embedding a light source can aid playing in the dark and can provide a distinguishing look. Also, a sensor can be embedded in a lacrosse head to provide various measurements (e.g., the force at impact, the speed of a ball, the speed of a swing, etc.). Alternatively, an optical or electrical wire can be added after the lacrosse head is printed. An electrical wire can also be used to drive a piezoelectric material to reduce vibration in the lacrosse head and/or stick. Additionally, a sound producing component (e.g., whistle) may be added or printed directly into the head to produce a sound when the lacrosse head is swung.

Steps 1210 and 1220 can be reversed. A user can provide a printing material to the 3D printer first, followed by providing a lacrosse head design. The printing material can be already attached to the printer without requiring a user to provide it separately.

In step 1230, the 3D printer prints a lacrosse head based on the provided design and the provided printing material.

When used with a 3D printer not designed for automatic switching of materials, steps 1220 and 1230 can be repeated. A user provides a printing material for a portion of a lacrosse head in step 1220, and the printer prints the portion in step 1230. The user can replace the printing material with another printing material for a next portion in step 1220, and the printer prints the new portion using the new material in step 1230. The steps repeat until the desired lacrosse head is printed or formed.

In alternative embodiments, a 3D printer can print other sections of a lacrosse stick. For instance, a 3D printer can print both the shaft portion and the head portion of a lacrosse stick. The shaft portion of the stick can be printed with a stiffer material than the head portion. For example, the head can be printed with a mixture of 70% plastic and 30% carbon fiber, and the stick can be printed with 100% carbon fiber. As described above, the head can be made of any combination of plastic and carbon fiber (e.g., 60% carbon fiber and 40% plastic, 50% carbon fiber and 50% plastic, 30% carbon fiber and 70% plastic). The percentages or concentrations of the material may be based on weight, volume, the number of passes by a 3D printer, or other appropriate measureable units. Also, any other materials can be mixed with the carbon fiber to make the lacrosse head. In some embodiments, fiberglass or fiberglass composites can be used as an exemplary material. Similar to the variations in the lacrosse head material, the lacrosse stick can be made of various composites of materials. For example, the lacrosse stick can be a carbon fiber composite material, composed of 90% carbon fiber and 10% plastic or any other combination. Further, different moduli and thickness (e.g., 1K, 3K, etc.) of carbon fiber may be utilized within the lacrosse head. In another example, a 3D printer can print a pocket, or a webbing/pocket 120 of a lacrosse stick. Different portions of the lacrosse head can be printed separately or together in one piece. Because of different degrees of desired strength, a different mix of materials or different materials can be used for different sections.

In some instances, carbon fiber strands of varying lengths may be provided in the lacrosse head during fabrication. The printing may begin from the front of the head or the back of the head depending upon the desired structure and shape. During 3D printing, layers of material are deposited one at a time. In accordance with embodiments of the present disclosure, carbon fiber strands of particular lengths may be deposited in particular layers as the head is built up. In some instances, the carbon fiber strands may be deposited as its own layer or as part of a layer of another material.

In some embodiments, a user can add a structure to the shaft. For example, the structure can be in the form of a handle or a butt end. Alternative to using a tape, having the pre-manufactured structure will help a user to firmly hold the stick. The shaft portion can also have a custom design for a unique look. Additionally, the structure of the handle may be a custom profile based on player hand measurements.

In other embodiments, the shaft portion of a lacrosse stick can have an adjustable length. In an exemplary embodiment, there can be two shaft portions: an inner shaft portion and an outer shaft portion. An outer shaft is configured to house an inner shaft, and one can extend the length of the lacrosse stick by sliding the inner shaft. The shaft can be designed such that by turning the inner or outer shaft, the shaft portions can slide along each other. When a player achieves the desired amount of extension, the player can turn the shaft back to lock the inner and outer shaft portions from sliding. This can be useful because defenders play with longer sticks while mid fielders and attackmen play with shorter sticks.

In additional embodiments, the above-noted process may be implemented to manufacture protective gear. For example, helmets, chest protectors, braces, thumb braces, and arm protection may be manufactured using the above-noted techniques. In some instances, the protective gear may be custom manufactured to fit a player's body. 3D scanning techniques may be used to scan a relevant portion of a player's body (e.g., hand) and this information may be used to manufacture custom protective equipment (e.g., thumb brace) for that player.

This type of custom protective equipment can be particularly advantageous for certain positions. For example, goalies often wear protective equipment such as thumb braces to prevent injury. Current protective equipment, however, may limit a player's range of motion and decrease their effectiveness in the sport. Using the present techniques, custom protective equipment may be manufactured for a particular player and in accordance with that player's preferences. In the instance of a thumb brace for a goalie, the custom equipment may advantageously provide strength to prevent a thumb from being over rotated towards the wrist due to specific placement of carbon fiber while still providing sufficient lateral flexibility for increase performance.

Other sporting equipment can be made with the 3D printing process described above. Some of these sporting equipment can be available as a carbon fiber material, but other equipment may not be available because of the difficult conventional manufacturing process involving carbon fiber. 3D printed carbon fiber sporting equipment can include bicycles, tennis rackets, hockey sticks, fishing rods, surfboards, arrows, or bullets.

The present disclosure describes manufacturing a carbon fiber or fiberglass lacrosse head using a 3D printing technique. However, the manufacturing process is not limited to a 3D printing technique. Any other technique that can form an object with carbon fiber or fiberglass is within the scope of this invention.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

The invention claimed is:

1. A 3D printed lacrosse head comprising:
   a top lacrosse head region comprising layered plastic, wherein at least a portion of the top lacrosse head region is curved;
   a left lacrosse head sidewall comprising layered plastic, the left lacrosse head sidewall being adjacent to the top lacrosse head region and at least a portion of the left lacrosse head sidewall being curved;
   a right lacrosse head sidewall comprising layered plastic, the right lacrosse head sidewall being adjacent to the top lacrosse head region and at least a portion of the right lacrosse head sidewall being curved; and
   a bottom lacrosse head region comprising layered plastic, the bottom lacrosse head region being adjacent to both the left lacrosse head sidewall and the right lacrosse head sidewall and at least a portion of the bottom lacrosse head region being curved,
   wherein the layered plastic of at least one of the top lacrosse head region, the left lacrosse head sidewall, the right lacrosse head sidewall, and the bottom lacrosse head region has at least one strand of carbon fiber, fiber glass, or Kevlar embedded in an inner cross-section, wherein the at least one strand extends continuously through and is curved to correspond to the respective curved portion, and wherein a stiffness of the region having the at least one strand is different from the other regions.

2. The 3D printed lacrosse head of claim 1, wherein the top lacrosse head region has at least one of the strands dispersed through a cross-section of the top lacrosse head region and the bottom lacrosse head region has at least one of the strands dispersed through a cross-section of the bottom lacrosse head region.

3. The 3D printed lacrosse head of claim 2, wherein the top lacrosse head region has more of the strands than the bottom region.

4. The 3D printed lacrosse head of claim 2, wherein the top lacrosse head region and bottom lacrosse head region both have less of the strands than both the left and right lacrosse head sidewalls.

5. The 3D printed lacrosse head of claim 1, wherein the left lacrosse head sidewall has the at least one strand dispersed through a cross-section of the left lacrosse head sidewall.

6. The 3D printed lacrosse head of claim 1, wherein the right lacrosse head sidewall has the at least one strand dispersed through a cross-section of the right lacrosse head sidewall.

7. The 3D printed lacrosse head of claim 1, wherein one or more cross-sections comprise a circular arrangement of the strands.

8. The 3D printed lacrosse head of claim 1, wherein one or more cross-sections comprise a linear arrangement of the strands.

9. The 3D printed lacrosse head of claim 1, wherein one or more cross-sections comprise an arrangement of the strands symmetric around an axis of the respective cross-section.

10. The 3D printed lacrosse head of claim 1, wherein one or more cross-sections comprise a square arrangement of the strands.

11. The 3D printed lacrosse head of claim 1, wherein at least one of the strands extends continuously through at least two of the top lacrosse head region, the left lacrosse head sidewall, the right lacrosse head sidewall, and the bottom lacrosse head region.

12. The 3D printed lacrosse head of claim 1, wherein at least one of the top lacrosse head region, the left lacrosse head sidewall, the right lacrosse head sidewall, and the bottom lacrosse head region comprises a plurality of the strands parallel to each other.

13. The 3D printed lacrosse head of claim 1, wherein at least one of the top lacrosse head region, the left lacrosse head sidewall, the right lacrosse head sidewall, and the bottom lacrosse head region comprises a plurality of the strands crossing each other to form a cross-hatch pattern, and wherein the layered plastic of at least one of the top lacrosse head region, the left lacrosse head sidewall, the right lacrosse head sidewall, and the bottom lacrosse head region are formed in a honeycomb structure.

14. The 3D printed lacrosse head of claim 1, further comprising:
a filament extending through each of the top lacrosse head region, the left lacrosse head sidewall, the right lacrosse head sidewall, and the bottom lacrosse head region, wherein a flexibility of the top lacrosse head region, the left lacrosse head sidewall, the right lacrosse head sidewall, and the bottom lacrosse head region is dependent upon an amount of tension applied to the filament.

15. The 3D printed lacrosse head of claim 1, wherein at least one of the left lacrosse head sidewall and the right lacrosse head sidewall comprises a plurality of holes extending laterally through the left or right lacrosse head sidewall and at least one of the strands is disposed adjacent to the plurality of holes.

16. The 3D printed lacrosse head of claim 1, wherein the top lacrosse head region has a smooth back surface opposite a pocket formed by the top lacrosse head region, the left lacrosse head sidewall, the right lacrosse head sidewall, and the bottom lacrosse head region.

17. The 3D printed lacrosse head of claim 1, wherein a pivot point is formed in the left lacrosse head sidewall and the right lacrosse head sidewall based on the strands in the top lacrosse head region, the left lacrosse head sidewall, the right lacrosse head sidewall, and the bottom lacrosse head region.

18. The 3D printed lacrosse head of claim 1, further comprising:
a lacrosse head neck region comprising layered plastic having one or more strands of carbon fiber, fiberglass, or Kevlar dispersed throughout a cross-section of the lacrosse head neck region, the lacrosse head neck region being adjacent to the bottom lacrosse head region.

19. The 3D printed lacrosse head of claim 1, further comprising:
an optical fiber element.

20. The 3D printed lacrosse head of claim 1, wherein the layered plastic of at least one of the top lacrosse head region, the left lacrosse head sidewall, the right lacrosse head sidewall, and the bottom lacrosse head region has one or more strands of carbon fiber, fiberglass, and Kevlar embedded therein, and wherein the one or more strands of carbon fiber, fiberglass, and Kevlar extend continuously through and are curved to correspond to the respective curved portion.

21. A method of 3D printing the lacrosse head of claim 1 comprising:
three-dimensionally printing a top lacrosse head region comprising layered plastic, wherein at least a portion of the top lacrosse head region being curved;
three-dimensionally printing a left lacrosse head sidewall comprising layered plastic, the left lacrosse head sidewall being formed adjacent to the top lacrosse head region and at least a portion of the left lacrosse head sidewall is curved;
three-dimensionally printing a right lacrosse head sidewall comprising layered plastic, the right lacrosse head sidewall being formed adjacent to the top lacrosse head region and at least a portion of the right lacrosse head sidewall being curved; and
three-dimensionally printing a bottom lacrosse head region comprising layered plastic, the bottom lacrosse head region being formed adjacent to both the left lacrosse head sidewall and the right lacrosse head sidewall and at least a portion of the bottom lacrosse head region being curved,
wherein the layered plastic of at least one of the top lacrosse head region, the left lacrosse head sidewall, the right lacrosse head sidewall, and the bottom lacrosse head region has at least one strand of carbon fiber, fiberglass, or Kevlar embedded in an inner cross-section, wherein the at least one strand extends continuously through and is curved to correspond to the respective curved portion, and wherein a stiffness of the region having the at least one strand is different from the other regions.

* * * * *